United States Patent [19]

Riggs et al.

[11] 4,275,768
[45] Jun. 30, 1981

[54] HOSE HAVING ENGRAVED INDICIA STRIP

[76] Inventors: E. Gray Riggs, 709 Winmar Pl., E., Westerville, Ohio 43081; Joseph K. Simmonds, 4889 Kingshill Dr., Apt 103, Columbus, Ohio 43229; Vernon D. Browning, 1692 Colonial Dr., Bucyrus, Ohio 44820

[21] Appl. No.: 915,918

[22] Filed: Jun. 16, 1978

[51] Int. Cl.³ .......................... F16L 9/04; F16L 9/12; F16L 55/00

[52] U.S. Cl. ............................ 138/104; 138/125; 264/173; 428/36; 428/203

[58] Field of Search ............... 264/250, 255, 171, 210, 264/132, 245, 103, 284, 293, 210.1, 210.2, 210.3, 134, 173; 40/316; 138/DIG. 7, 140, 141, 145, 153, 172, 174, 104; 427/264, 270, 271, 278; 428/36, 203

[56] References Cited

U.S. PATENT DOCUMENTS

| | | | |
|---|---|---|---|
| 1,991,996 | 2/1935 | Bakker | 427/270 |
| 2,169,930 | 8/1939 | Schuster | 138/104 |
| 2,175,099 | 10/1939 | Abbott | 264/284 |
| 2,186,788 | 1/1940 | Olson | 40/316 |
| 2,705,735 | 4/1955 | Wolf | 40/316 UX |
| 2,810,424 | 10/1957 | Swartzwelder et al. | 264/103 |
| 2,867,001 | 1/1959 | Lewis et al. | 264/284 |
| 2,870,619 | 1/1959 | Greczin | 138/125 |
| 2,882,163 | 4/1959 | Knaff | 138/118.1 |
| 3,198,868 | 8/1965 | Pedretti et al. | 264/347 |
| 3,212,207 | 10/1965 | Searing | 40/316 |
| 3,249,666 | 5/1966 | French | 264/173 |
| 3,278,322 | 10/1966 | Harkins et al. | 427/278 |
| 3,367,370 | 2/1968 | Sherlock | 138/103 |
| 3,373,735 | 3/1968 | Gallagher | 138/104 |
| 3,474,559 | 10/1969 | Hunt | 40/316 |
| 3,551,542 | 12/1970 | Perrone | 40/316 |
| 3,600,918 | 6/1968 | Lemelson | 264/132 |
| 3,650,059 | 3/1972 | Johnson | 40/316 |
| 3,790,651 | 2/1974 | Meitinger | 264/173 |
| 3,891,008 | 6/1975 | D'Entremont | 264/173 |
| 4,040,670 | 8/1977 | Williams | 264/255 |
| 4,112,031 | 9/1978 | Gohlisch | 264/26 |

OTHER PUBLICATIONS

Modern Plastics Encyclopedia, McGraw-Hill, (1965) pp. 145–147, 150, 151, 355, 356, 357, 480–481.

Primary Examiner—W. E. Hoag

[57] ABSTRACT

A longitudinally extending, circumferentially limited member is disposed upon the exterior surface of a tubular object such as hose, which member has a surface appearance contrasting to that of the exterior surface of the tubular object. Indicia is engraved within the surface of the longitudinally extending, circumferentially limited member and is rendered prominently visible by the difference in contrast between the two surface appearances.

2 Claims, 3 Drawing Figures

HOSE HAVING ENGRAVED INDICIA STRIP

The present invention relates generally to a method of marking a tubular article and more particularly, to a method of applying indicia or other identifying information to a tubular article such as lawn and garden hose.

When lawn and garden hose is sold to a consumer, a predetermined length of such hose (e.g., fifty feet) typically is wound in a coil and a cardboard disk attached thereto containing the manufacturer's or distributer's brandname or other identifying indicia. However, when the hose is used, the cardboard disk is dispensed with and for all intents and purposes the hose is devoid of all brandname marking or other information conveying indicia. While it is admittedly old to engrave or print indicia directly onto the exterior surface of tubular objects such as hose as disclosed in U.S. Pats. Nos. 3,387,330, 2,953,085, and 2,903,743, for example, heretofore this practice has not found much success in the lawn and garden hose industry because generally speaking, no one has been able to develop a relatively inexpensive method of applying indicia to hose so that the indicia remains visibly prominent throughout the normal lifetime of the hose. This is especially so in connection with the modern and ever popular lawn and garden hose of the extruded vinyl plastic type which commonly has an exterior surface appearance which makes it extremely difficult, if not impossible, to imprint or engrave indicia thereon having sufficient contrast to the surface appearance of such hose so as to be clearly visible.

Against the foregoing background, it is a primary object of the present invention to provide a method for applying indicia to a tubular article, such as lawn and garden hose, wherein the indicia remain prominently visible throughout the normal life of the hose.

It is another object of the present invention to provide a method of applying indicia to the exterior surface of the hose wherein the indicia is displayed in prominent contrast with respect to the exterior surface appearance of the hose.

It is yet another object of the present invention to provide an article of hose having thereon engraved indicia which latter is substantially permanent and is rendered highly visible.

It is still yet another object of the present invention to provide an article of hose having at least two different surface appearances in relatively sharp contrast to one another and having indicia engraved within that portion of the hose common to one such surface appearance.

Toward the accomplishment of the foregoing objects, the present invention briefly described, provides for fabricating a tubular hose article by extruding a first tubular member to give the hose a first surface appearance, extruding a longitudinally extending member of limited circumferential extent upon the surface of said tubular member having a second surface appearance in contrast to said first surface appearance, and engraving indicia in said longitudinally extending, circumferentially limited member.

The foregoing and other objects and advantages will be made more apparent by a study of the detailed description of preferred embodiments of the invention in connection with the drawings wherein, briefly described:

Figures 2, 3:
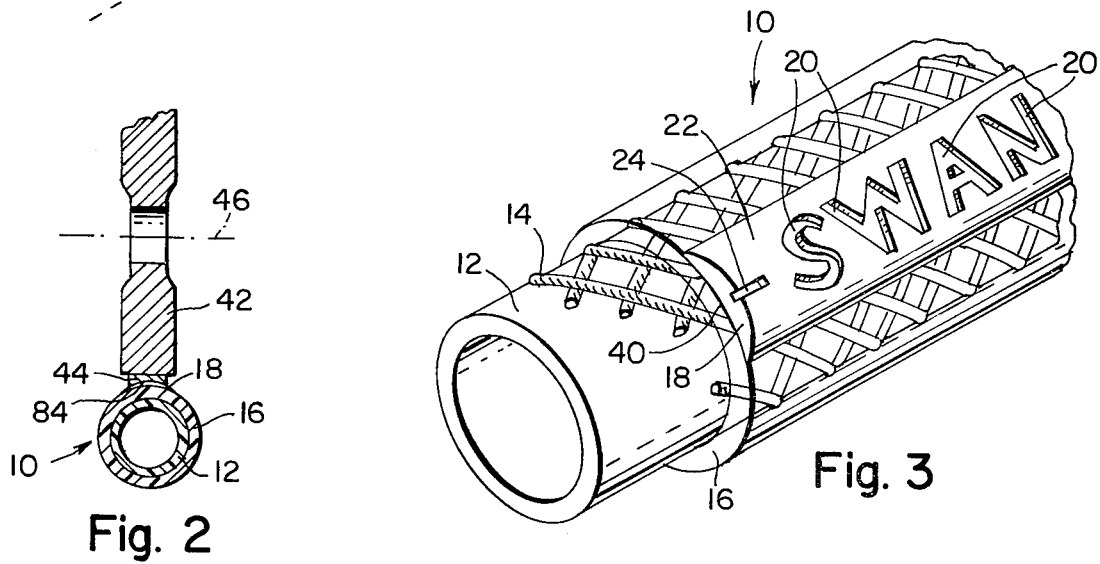
FIG. 2 is a sectional view in elevation diagramatically showing the position between the engraving wheel of the apparatus of FIG. 1 and the extruded hose article being made on such apparatus.
FIG. 3 is a perspective fragmentary view of the hose article of the present invention.

Referring initially to FIG. 3, there is schematically shown a preferred form of hose article according to the present invention generally represented by reference numeral 10 and comprising an inner tubular member 12, an intermediate reinforcing member 14, and an outer cover or jacket 16. The inner member as well as the outer jacket or cover is extruded from a synthetic plastic material such as vinyl plastic whereas the reinforcing member consists of a filament of high tensile strength such as polyester fiber or nylon cord spirally wrapped, knitted, or braided about the inner member prior to having the outer cover or jacket extruded thereon. In the preferred form of the invention, the inner tubular member is opaque and of a black or other suitably dark color, the reinforcing filament is white, and the outer jacket is translucent with a slightly greenish cast. As a result, when viewed externally, the pattern of the spirally wrapped, knitted, or braided reinforcing member appears as light green in sharp contrast against the dark background afforded by the inner member thus giving to the hose exterior a characteristically distinctive first surface appearance.

In an alternatively preferred embodiment (not shown), a thin tubular layer of a relatively light color such as yellow, for example, is extruded over the inner tubular member prior to having the intermediate reinforcing layer applied and a transparent outer jacket is employed. This also produces a hose exterior having a characteristically distinctive first surface appearance albeit showing slightly less of a pattern.

Adhered to the exterior surface of the outer member 16 substantially as shown is a longitudinally extending member 18 of limited transverse or circumferential extent as measured with respect to the outer circumference of hose 10, i.e., the circumference of the exterior surface of outer jacket or cover 16. In the preferred embodiment schematically illustrated, member 18 is opaque and of a pea green color, thus presenting a second surface appearance which visually contrasts sharply with respect to the remaining portion of the hose exterior common to and presenting the first surface appearance. Engraved within the outwardly facing surface 22 of member 18 is a series of letters 20 comprising displayed indicia which in the illustrated embodiment consists of the word "SWAN", a trademark owned by the assignee of the present application. Also shown, is a "hyphen" 24 engraved in surface 22 and which serves to visually separate the aforementioned trademark from other information conveying indicia (not shown) displaced therefrom longitudinally on member 18.

It will be noted that the cross-section of member 18 as viewed in FIG. 3 is generally crescent shaped i.e., it tapers from a maximum thickness in its center toward either opposed longitudinally extending extremity thereof, thus facilitating a smooth integration with the exterior surface of the hose outer jacket 16 although this might not be so apparent from FIG. 3 which is of exaggerated disproportionate scale for the sake of illustration. By utilizing a member 18 having such a crescent shaped cross-sectional shape sufficient depth is afforded in the central region thereof to receive therein the engraved indicia without exposing the exterior surface of outer jacket or cover 16. The term "engraved" as used herein refers to the formation of recesses within member 18 below the latter's outwardly facing surface 22.

By virtue of its limited circumferential or transverse extent, contrasting color and opaque character, the member 18 presents a surface appearance which is distinctly different from and in stark contrast to the surface appearance presented by the remaining portion of the hose outer jacket exterior; hence, the eye of an observer is immediately brought to and focuses on the indicia engraved within member 18. Moreover, due to such engraving, the indicia remains substantially permanent and will remain visible for as long as the hose is in service. If such indicia were engraved, for example, directly into the outer surface of the hose outer jacket 16, and not within member 18 as taught by the present invention, the indicia would be lost against the "busy" pattern of the hose reinforcement rendered visible through the translucent outer jacket of the hose and accordingly, would be extremely difficult to see.

It will be appreciated that visibility of the engraved indicia may be even further enhanced by inking in or filling in the engraved recesses with ink or some other suitably permanent medium preferably of a color different than and in sharp contrast to the color of member 18.

In connection with the preferred embodiment, it will further be appreciated that the member 18 extends longitudinally along the entire longitudinal extent of hose 10 and that the trademark "SWAN" or other similar indicia is repeated at regular spaced intervals. The member 18, however, could extend along selected longitudinally extending portions of the hose in say a broken line pattern, or may extend helically or spirally with respect to the hose's longitudinal extent. Also, any form of indicia in any desired pattern may obviously be engraved within the member 18.

Figure 1:
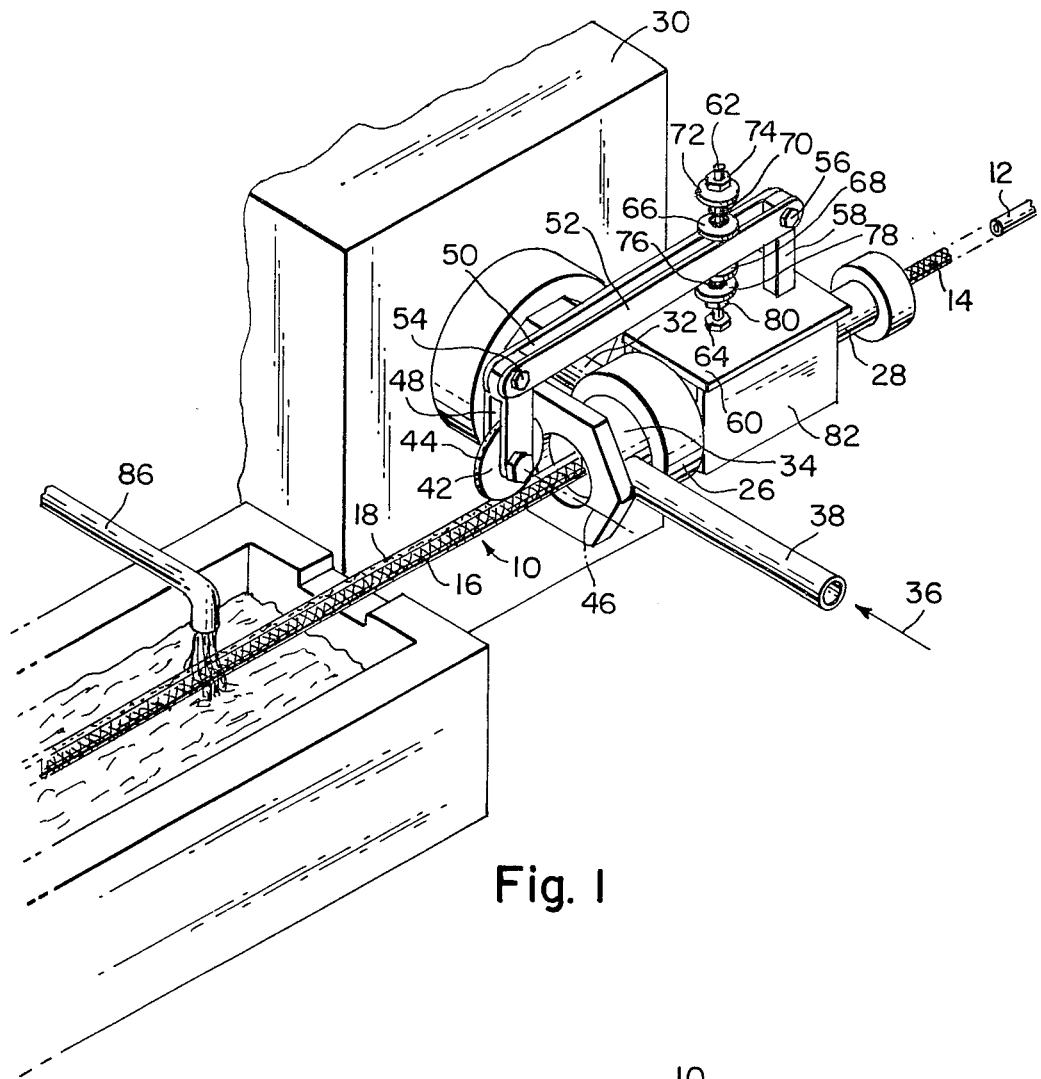
FIG. 1 is a perspective fragmentary view of a preferred form of apparatus capable of practicing the method and of producing the hose article of the present invention.

Turning now to FIGS. 1 and 2, the preferred method of making the novel hose article of the present invention will now be described in more detail.

Inner tubular member 12 which, as mentioned, is of a polymeric thermoplastic material such as conventional vinyl plastic, is extruded and the reinforcing member (e.g., polyester or nylon) is then spirally wrapped, knitted, or braided thereabout all in a conventional well known manner. As shown in FIG. 1, the reinforced inner tubular member is continuously applied through a first extrusion die 26 by means of guide barrel 28 wherein thermoplastic material is applied under suitable temperature and pressure from a first extruder 30 via conduit 32 and a suitably cylindrically shaped extrusion orifice (not shown) to extrude the outer jacket or cover 16 about the reinforced inner tubular member. The hose then passes through a second extrusion die 34 positioned slightly downstream from first extrusion die 26 wherein thermoplastic material is applied under suitable temperature and pressure from a second extruder (not shown) as indicated by arrow 35, through conduit 38 and a suitably crescent shaped extrusion orifice (not shown) to extrude the longitudinally extending, circumferentially limited member 18 onto the exterior surface of the prior extruded outer jacket 16. The crescent shaped extrusion orifice of the second die 34 is so positioned that the member 18 is extruded at about the 12 o'clock position of the hose circumference, and thus faces upwardly as the hose exits from the second die 34 substantially as shown in FIG. 1. When the member 18 is extruded upon the hose outer cover 16, the temperature and pressure in the extrusion die 34 is such as to fuse the member 18 to the hose outer cover all along their common confronting surfaces defined by juncture 40 (FIG. 3) and the member 18 thus becomes permanently affixed thereto forming a portion of the hose exterior of limited circumferential extent.

As the hose exits from extrusion die 34, the extrudate of thermoplastic material has cooled to a semi-solid, softened state and is ready for receiving the engraved indicia thereon. Toward this end, an engraving wheel 42 positioned substantially immediately adjacent the exit plane of extrusion die 34 is supported for rotation about an axis 46 by a bifurcated member or fork 48 which in turn is connected at its upper end to a pair of horizontal support links 50, 52 via a suitable bolt 54 extending through suitably registering apertures (not shown) in the upper portion of fork 48 and each link end portion, the bolt being held therein by a washer/nut or cotter pin (not shown). Preferably, the fork member is loosely mounted relative to the horizontal support links 50, 52 so that the fork and the engraving wheel 42 may be swung about an axis defined by bolt 54. Thus, the engraving wheel may easily be rotated into or away from the position shown as and when desired.

The horizontal support links are supported at their rearward opposed ends by another bolt 56 extending through suitably registering apertures (not shown) in each rearward end portion and in the upper portion of a vertically oriented support post 58, the latter being integrally and rigidly supported, in turn, on horizontal support plate 60 as by being welded thereto. Displaced forwardly on support plate 60 relative to post 58 is the vertically oriented threaded shank of a bolt 62 maintained in fixed position thereon by a nut 64. The shank extends between the two horizontal support links substantially as shown and engages the two links via a pair of spaced washers 66, 68. A first compression coil spring 70 extends between washer 66 and another washer 72 spaced therefrom with the compression coil spring urging the latter washer against a nut 74 threadedly positioned on bolt shank 62 with nut 74 preferably being of the self-locking variety such as is sold under the trademark "Elastic Stop" by the assignee of the present application. Similarly, another compression coil spring 76 extends between washer 68 and still another washer 78 spaced therefrom with the coil spring urging washer 78 against a second nut 80 threadedly positioned upon the threaded shank of bolt 62. By adjusting the position of nuts 74, 80 axially relative to each other and/or the threaded shank of bolt 62, the position of the horizontal links 50, 52 relative to the support plate 60 may easily be raised or lowered to precisely position the engraving wheel relative to the hose exiting from extrusion die 34. In addition, the foregoing support structure resiliently urges the engraving wheel periphery against the surface of the member 18 on the hose, and thus a steady engraving pressure is achieved producing engraved indicia on member 18 of substantially uniform depth despite slight up and down displacements of the hose as it moves tangentially past the engraving wheel.

The horizontal support plate 60 is rigidly affixed to guide barrel 28 substantially in the position shown in FIG. 1 by means of a pair of hinged side plates 82 (only one of which is shown) and a suitable fastener such as a strap and clasp (not shown) located underneath the guide and which is adapted to securely maintain the hinged side plates in an engaging manner against the guide barrel.

The engraving wheel 42 is supported for free rotation about the shank of bolt 55 carried by fork member 48, and has a plurality of embossed letters or similar indicia carried on the periphery thereof, with the letters or indicia being mirror images of the corresponding indicia intended to be engraved within the outwardly facing surface of member 18. Such engraving or embossing wheels, per se, are well known in the art as shown for example, in the aforementioned U.S. Pat. No. 3,387,330. However, in accordance with the present invention, the embossed or raised lettering or other indicia on the periphery of the engraving wheel is curved in a concave manner as shown in FIG. 2 such that the depth of each engraved letter is uniform despite the curvature of the outer surface 22 of member 18.

In performing the method of the present invention, the tubular inner member is extruded in a conventional manner and the reinforcing member 14 is applied thereabout also in a conventional manner. The reinforced inner tubular member is then passed via guide barrel 28 into and through extrusion die 26 which causes the outer jacket or cover 16 to be extruded about the reinforced inner tubular member. The latter then passes through the second extrusion die 34 and the longitudinally extended, circumferentially limited member 18 is extruded onto the surface of the outer jacket in an upwardly facing manner. The resulting hose then exits from extrusion die 34 with the longitudinally extending, circumferentially limited member 18 engaging the embossed or raised lettering or other indicia 44 on the periphery of engraving wheel 42 thus causing the engraving wheel to rotate about its axis 46 as the hose 10 moves tangentially past the engraving wheel. The hose then passes under a running faucet 86 of cold water or other cooling medium whereupon the temperature of the thermoplastic material of the hose is reduced sufficiently to cause the hose to solidify such that the inner member 12, the outer jacket or cover 16, and the longitudinally extending, circumferentially limited member 18 are fused together and the engraved indicia 20, 24 reposes within member 18 in a dimensionally stable manner. Of course, as mentioned, a suitable inked roller may be provided to transfer ink to the outwardly facing surface 84 of each raised or embossed letter or other indicia on the periphery of wheel 42 preferably of a different color than that of member 18 so that the ink may be deposited into the recesses defining the engraved indicia, thus further enhancing the contrast and visual prominence thereof.

By way of further illustrating the present invention without limiting same, the preferred embodiment of hose has an inner tubular member of about 0.625 inches inside bore and of about 0.063 wall thickness, an intermediate reinforcing member of knitted polyester cord, an outer tubular jacket or cover of about 0.047 inches wall thickness and a continuous longitudinally extending, circumferentially limited member 18 having a transverse width or extent of about 0.375 inches. The lettering or other indicia engraved therein consists of the phrase "Swan Best Pressure Master" (Swan and Pressure Master are trademarks of the assignee of the present application) repeated about every ten inches along the member 18 with each phrase being separated by a series of ten hyphens. Each engraved letter and/or hyphen has a depth below surface 22 of member 18 within the range of about 0.016 inches to 0.032 inches and a letter height of about 0.187 inches. Whereas the first surface appearance defined by the outer exterior surface of the hose jacket or cover appears as a light greenish knitted pattern against a dark greenish background, the member 18 presents a second surface appearance consisting of a longitudinally extending, circumferentially limited member of pea green color which contrasts dramatically with the remaining portion of the hose affording said first surface appearance. Due to such contrast, the eye of an observer tends to focus upon the indicia or other letters engraved in the member 18. In addition, the provision of different, contrasting surface appearances and the engraved indicia within the longitudinally extending, circumferentially limited member lends to the hose an esthetically appealing overall appearance that immediately catches the eye so-to-speak.

For purposes of construing the claims appended hereto, it will be realized that in a broad aspect of the present invention, the provision of the longitudinally extending, circumferentially limited member 18 actually affords a hose exterior surface having first and second portions which, in turn, define corresponding first and second contrasting surface appearances, one of which includes indicia engraved therein. Hence, it will be realized that the principles of the present invention are not limited to the preferred embodiment comprising a thermoplastic hose. Thus, for example, a tubular article or lawn and garden hose made of a thermoset material such as rubber whose exterior surface includes a longitudinally extending, circumferentially limited portion may in accordance with the present invention have indicia engraved thereon prior to the hose being vulcanized or cured. Still further, the circumferential extent of the longitudinally extending, circumferentially limited member may be chosen to be relatively wide or narrow as long as it is less than 360° to achieve the desired visual contrast between the first and second surface appearances defined thereby. Alternatively, the longitudinally extending, circumferentially limited member may have a circumferential extent which varies along the longitudinal extent of the hose or may consist of circumferential bands spaced longitudinally along the hose i.e., the member 18 may be in the form of a circumferentially extending, longitudinally limited member or plurality of such members. Finally, it will be appreciated that the member 18 need not be extruded onto the outer surface of the hose cover or jacket i.e., it may be extruded, molded, cast, or otherwise formed as an integral portion of the hose outer cover, per se.

Thus, although a particular preferred embodiment has been disclosed in detail as required by statute, it will be appreciated that many changes or modifications may be made without departing from the spirit and scope of the present invention as defined by the claims appended hereto.

We claim:

1. A hose comprising a first element in the form of a tube having an axis and a convex outer surface of a first surface appearance and of predetermined curvature with respect to said axis and a second element in the form of an opaque strip extending longitudinally of said tube and having a concave inner surface conforming and fused to less than the full circumference of the convex outer surface of said tube and a convex outer surface of a second, opaque surface appearance visually contrasting to said first surface appearance and having longitudinal edges coincident with the longitudinal edges of the concave inner surface of said strip and of predetermined curvature with respect to said axis which is sharper than that of the convex outer surface of said tube, so that said strip is of maximum radial thickness midway between its longitudinal edges, and indicia engraved in the outer convex surface of said strip but not extending through said strip.

2. The hose of claim 1 wherein said tube includes an inner tubular member having external reinforcement and an outer tubular cover on said inner tubular member, said outer tubular cover providing said convex surface of said tube and said outer tubular cover being translucent or transparent to permit said reinforcement to be visible through said outer tubular cover and provide said first surface appearance.

* * * * *

UNITED STATES PATENT AND TRADEMARK OFFICE
CERTIFICATE OF CORRECTION

PATENT NO. : 4,275,768

DATED : June 30, 1981

INVENTOR(S) : E. Gray Riggs et al.

It is certified that error appears in the above—identified patent and that said Letters Patent is hereby corrected as shown below:

On the Title Page, change the heading number of the heading which gives the inventors' names from "[76]" to --[75]--; immediately above the line reading "[21] Appl. No.: 915,918" insert the line --[73] Assignee: Amerace Corporation, New York, N.Y.--; and immediately above the line reading "[57] ABSTRACT" insert the line --Attorney, Agent, or Firm - Richard A. Craig; S. Michael Bender--.

Signed and Sealed this

Third Day of November 1981

[SEAL]

Attest:

GERALD J. MOSSINGHOFF

Attesting Officer

Commissioner of Patents and Trademarks